(12) United States Patent
Sullivan et al.

(10) Patent No.: US 7,037,965 B2
(45) Date of Patent: May 2, 2006

(54) GOLF BALLS COMPRISING GLASS IONOMERS, ORMOCERS, OR OTHER HYBRID ORGANIC/INORGANIC COMPOSITIONS

(75) Inventors: Michael J. Sullivan, Barrington, RI (US); Derek A. Ladd, Acushnet, MA (US)

(73) Assignee: Acushnet Company, Fairhaven, MA (US)

( * ) Notice: Subject to any disclaimer, the term of this patent is extended or adjusted under 35 U.S.C. 154(b) by 294 days.

(21) Appl. No.: 10/774,277

(22) Filed: Feb. 6, 2004

(65) Prior Publication Data

US 2004/0157973 A1 Aug. 12, 2004

Related U.S. Application Data

(63) Continuation-in-part of application No. 10/229,344, filed on Aug. 27, 2002, now Pat. No. 6,793,592.

(51) Int. Cl.
A63B 37/00 (2006.01)
A63B 37/12 (2006.01)
A63B 37/02 (2006.01)
C08L 33/02 (2006.01)

(52) U.S. Cl. .............. 524/397; 524/394; 524/398; 524/399; 524/400; 524/443; 524/444; 525/330.2; 473/372; 473/373

(58) Field of Classification Search ............... None
See application file for complete search history.

(56) References Cited

U.S. PATENT DOCUMENTS

| | | | |
|---|---|---|---|
| 4,215,033 A | 7/1980 | Bowen | 260/42.15 |
| 4,625,964 A | 12/1986 | Yamada | 273/62 |
| 4,676,508 A * | 6/1987 | Dilny | 473/237 |
| 4,679,794 A * | 7/1987 | Yamada et al. | 473/385 |
| 4,863,167 A | 9/1989 | Matsuki et al. | 273/62 |
| 5,002,281 A | 3/1991 | Nakahara et al. | 273/220 |
| 5,048,838 A | 9/1991 | Chikaraishi et al. | 273/228 |
| 5,104,126 A | 4/1992 | Gentiluomo | 273/228 |
| 5,112,884 A | 5/1992 | Hanke | 523/116 |
| 5,273,286 A | 12/1993 | Sun | 273/228 |
| 5,372,796 A | 12/1994 | Wellinghoff | 423/65 |
| 5,439,381 A | 8/1995 | Cohen | 433/173 |
| 5,482,285 A | 1/1996 | Yabuki et al. | 273/228 |
| 5,512,611 A | 4/1996 | Mitra | 523/116 |
| 5,520,725 A | 5/1996 | Kato et al. | 106/35 |
| 5,552,485 A | 9/1996 | Mitra et al. | 525/102 |
| 5,621,035 A | 4/1997 | Lyles et al. | 524/404 |
| 5,622,552 A | 4/1997 | Arnold | 106/35 |
| 5,670,258 A | 9/1997 | Mitra et al. | 428/405 |
| 5,670,583 A | 9/1997 | Wellinghoff | 525/389 |
| 5,688,191 A | 11/1997 | Cavallaro et al. | 473/373 |
| 5,698,019 A | 12/1997 | Frank et al. | 106/35 |
| 5,713,801 A | 2/1998 | Aoyama | 473/354 |
| 5,759,676 A | 6/1998 | Cavallaro et al. | 428/215 |
| 5,766,771 A | 6/1998 | Merkel et al. | 428/447 |
| 5,779,561 A | 7/1998 | Sullivan et al. | 473/373 |
| 5,783,293 A | 7/1998 | Lammi | 428/212 |
| 5,797,749 A | 8/1998 | Bertolotti et al. | 433/228.1 |
| 5,810,678 A | 9/1998 | Cavallaro et al. | 473/373 |
| 5,813,923 A | 9/1998 | Cavallaro et al. | 473/373 |
| 5,823,889 A | 10/1998 | Aoyama | 473/374 |
| 5,824,746 A | 10/1998 | Harris et al. | 525/196 |
| 5,833,553 A | 11/1998 | Sullivan et al. | 473/374 |
| 5,846,075 A | 12/1998 | Suh et al. | 433/23 |
| 5,859,089 A | 1/1999 | Qian | 523/116 |
| 5,861,445 A | 1/1999 | Xu et al. | 523/116 |
| 5,865,620 A | 2/1999 | Kutsch | 433/88 |
| 5,865,623 A | 2/1999 | Suh | 433/228.1 |
| 5,873,796 A | 2/1999 | Cavallaro et al. | 473/365 |
| 5,885,172 A | 3/1999 | Hebert et al. | 473/354 |
| 5,925,715 A | 7/1999 | Mitra | 525/293 |
| 5,932,291 A | 8/1999 | Sayers et al. | 427/387 |
| 5,935,022 A | 8/1999 | Sugimoto et al. | 473/373 |
| 5,965,632 A | 10/1999 | Orlowski et al. | 523/116 |
| 5,973,448 A | 10/1999 | Segner et al. | 313/461 |
| 5,981,620 A | 11/1999 | Hammesfahr et al. | 523/116 |
| 5,984,806 A | 11/1999 | Sullivan et al. | 473/373 |
| 5,989,651 A | 11/1999 | Sayers et al. | 427/512 |
| 6,015,356 A | 1/2000 | Sullivan et al. | 473/373 |
| 6,017,982 A | 1/2000 | Akinmade | 523/216 |
| 6,025,442 A | 2/2000 | Harris et al. | 525/221 |
| 6,043,296 A | 3/2000 | Davies et al. | 523/116 |
| 6,048,279 A | 4/2000 | Masutani | 473/372 |
| 6,057,403 A | 5/2000 | Sullivan et al. | 525/221 |
| 6,068,561 A | 5/2000 | Renard et al. | 473/364 |
| 6,095,932 A | 8/2000 | Umezawa et al. | 473/356 |
| 6,102,815 A | 8/2000 | Sutherland | 473/372 |
| 6,107,229 A | 8/2000 | Luck et al. | 501/151 |
| 6,120,393 A | 9/2000 | Sullivan et al. | 473/377 |
| 6,126,559 A | 10/2000 | Sullivan et al. | 473/378 |
| 6,136,737 A | 10/2000 | Todo et al. | 501/73 |
| 6,136,885 A | 10/2000 | Rusin et al. | 523/116 |
| 6,142,886 A | 11/2000 | Sullivan et al. | 473/371 |
| 6,142,887 A | 11/2000 | Sullivan et al. | 473/374 |
| 6,142,888 A | 11/2000 | Higuchi et al. | 473/374 |
| 6,147,136 A | 11/2000 | Bissinger | 523/116 |
| 6,149,536 A | 11/2000 | Sullivan et al. | 473/376 |
| 6,180,688 B1 | 1/2001 | Rheinberger et al. | 523/116 |
| 6,183,382 B1 | 2/2001 | Kim et al. | 473/374 |
| 6,191,191 B1 | 2/2001 | Harada et al. | 523/115 |

(Continued)

FOREIGN PATENT DOCUMENTS

WO   WO 97/31613   9/1997

(Continued)

OTHER PUBLICATIONS

Pure Appl. Chem., vol. 73, No. 4, pp. 685-774, 2001.

*Primary Examiner*—David J. Buttner

(57) ABSTRACT

A golf ball comprising a core and a cover layer, wherein at least one of the core or cover layer comprises a hybrid material that contains fatty acid-modified glass ionomers, an ormocer or other inorganic-organic materials.

19 Claims, No Drawings

U.S. PATENT DOCUMENTS

| | | | |
|---|---|---|---|
| 6,193,618 B1 | 2/2001 | Sullivan et al. | 473/373 |
| 6,200,137 B1 | 3/2001 | Holand et al. | 433/212.1 |
| 6,214,101 B1 | 4/2001 | Nakaseko | 106/35 |
| 6,219,453 B1 | 4/2001 | Goldberg | 382/229 |
| 6,264,472 B1 | 7/2001 | Okada et al. | 433/228 |
| 6,267,692 B1 | 7/2001 | Higuchi et al. | 473/365 |
| 6,267,694 B1 | 7/2001 | Higuchi et al. | 473/374 |
| 6,280,863 B1 | 8/2001 | Frank et al. | 428/701 |
| 6,287,639 B1 | 9/2001 | Schmidt et al. | 427/387 |
| 6,291,547 B1 | 9/2001 | Lyles et al. | 523/116 |
| 6,291,548 B1 | 9/2001 | Akahane et al. | 523/116 |
| 6,309,312 B1 | 10/2001 | Sullivan et al. | 473/375 |
| 6,309,314 B1 | 10/2001 | Sullivan et al. | 473/378 |
| 6,313,192 B1 | 11/2001 | Anstice et al. | 523/116 |
| 6,334,775 B1 | 1/2002 | Xu et al. | 433/228.1 |
| 6,339,114 B1 | 1/2002 | Klee et al. | 523/116 |
| 6,353,039 B1 | 3/2002 | Rheinberger et al. | 523/109 |
| 6,355,585 B1 | 3/2002 | Suzuki et al. | 501/35 |
| 6,399,037 B1 | 6/2002 | Pflug et al. | 423/342 |
| 6,407,148 B1 | 6/2002 | Krejci et al. | 523/116 |
| 6,417,246 B1 | 7/2002 | Jia et al. | 523/113 |
| 6,447,907 B1 | 9/2002 | Wolter et al. | 428/402 |
| 6,500,879 B1 | 12/2002 | Huang et al. | 523/116 |
| 6,613,812 B1 | 9/2003 | Bui et al. | 523/116 |
| 6,793,592 B1 * | 9/2004 | Sullivan et al. | 473/371 |
| 2001/0004870 A1 | 6/2001 | Naoumenko et al. | 106/287.16 |
| 2001/0006623 A1 | 7/2001 | Warford, III et al. | 424/49 |
| 2001/0019969 A1 | 9/2001 | Binette et al. | 473/354 |
| 2001/0026913 A1 | 10/2001 | Xu et al. | 433/228.1 |
| 2001/0051672 A1 | 12/2001 | Albert et al. | 523/116 |
| 2001/0056197 A1 | 12/2001 | Albert et al. | 556/9 |
| 2002/0012638 A1 | 1/2002 | Warford, III et al. | 424/58 |
| 2002/0013185 A1 | 1/2002 | Sullivan et al. | 473/373 |
| 2002/0018756 A1 | 2/2002 | Warford, III et al. | 424/58 |
| 2002/0028556 A1 | 3/2002 | Rueggeberg et al. | 523/115 |
| 2002/0029724 A1 | 3/2002 | Mott | 106/35 |
| 2002/0034989 A1 | 3/2002 | Sullivan et al. | 473/373 |
| 2002/0045149 A1 | 4/2002 | Alkemper et al. | 433/212.1 |
| 2002/0065337 A1 | 5/2002 | Pflug | 523/115 |
| 2002/0081269 A1 | 6/2002 | Trom et al. | 424/49 |
| 2002/0088372 A1 | 7/2002 | Abiru et al. | 106/35 |
| 2002/0198282 A1 | 12/2002 | Jia | 523/115 |

FOREIGN PATENT DOCUMENTS

| | | |
|---|---|---|
| WO | WO 97/31973 | 9/1997 |
| WO | WO 97/36943 | 10/1997 |
| WO | WO 97/47272 | 12/1997 |
| WO | WO 98/30192 | 7/1998 |
| WO | WO 98/38967 | 9/1998 |
| WO | WO 99/01104 | 1/1999 |
| WO | WO 99/10276 | 3/1999 |
| WO | WO 00/05182 | 2/2000 |
| WO | WO 00/55253 | 9/2000 |

* cited by examiner

GOLF BALLS COMPRISING GLASS IONOMERS, ORMOCERS, OR OTHER HYBRID ORGANIC/INORGANIC COMPOSITIONS

CROSS-REFERENCE TO RELATED APPLICATION

The present application is a continuation-in-part of co-pending U.S. patent application Ser. No. 10/229,344, filed Aug. 27, 2002 now U.S. Pat. No. 6,793,592 . The parent application is incorporated herein by reference in its entirety.

FIELD OF THE INVENTION

The present invention relates to a golf ball and, more particularly, a golf ball core or cover component that includes modified glass ionomers, ormocers, or other hybrid organic/inorganic compositions.

BACKGROUND OF THE INVENTION

Golf balls can generally be divided into two classes: solid and wound. Solid golf balls include one-piece, two-piece (i.e., solid core and a cover), and multi-layer (i.e., solid core of one or more layers and/or a cover of one or more layers) golf balls. Wound golf balls typically include a solid, hollow, or fluid-filled center, surrounded by tensioned elastomeric material, and a cover. Solid balls have traditionally been considered longer and more durable than wound balls, but also lack the particular "feel" that is provided by the wound construction and typically preferred by accomplished golfers.

By altering ball construction and composition, however, manufacturers can vary a wide range of playing characteristics, such as resilience, durability, spin, and "feel," each of which can be optimized for various playing abilities, allowing solid golf balls to provide feel characteristics more like their wound predecessors. The golf ball components, in particular, that many manufacturers continually look to improve are the center or core, intermediate layers, if present, and covers.

The core is the "engine" of the golf ball when hit with a club head. Generally, golf ball cores and/or centers are constructed with a polybutadiene-based polymer composition. Compositions of this type are constantly being altered in an effort to provide a targeted or desired coefficient of restitution ("COR") while at the same time resulting in a lower compression which, in turn, can lower the golf ball spin rate, provide better "feel," or both. This is a difficult task, however, given the physical limitations of currently-available polymers. As such, there remains a need for novel and improved golf ball core compositions.

Manufacturers also address the properties and construction of golf ball intermediate and cover layers. These layers have conventionally been formed of ionomer materials and ionomer blends of varying hardness and flexural moduli. This hardness range is still limited and even the softest blends suffer from a "plastic" feel according to some golfers. Recently, however, polyurethane-based materials have been employed in golf ball layers and, in particular, outer cover layers, due to their softer "feel" characteristics without loss in resiliency and/or durability.

There remains a need, however, for improved golf ball center, core, layer, cover, and coating materials and/or blends having further reduced or modified hardness and modulus while maintaining acceptable resilience and superior abrasion resistance and feel. The present invention is directed to golf balls having components formed of novel hybrid materials, such as modified glass ionomers, ormocers, and other inorganic-organic materials.

Ormocers, for example, are a relatively new class of composite materials formed of ceramic and polymer networks that combine and interpenetrate with one another. Ormocers may be generally classified as one, either organic- or inorganic-doped systems typically based on one major phase containing a second one in a relatively low amount; and two, either organic- or inorganic-doped systems in which the fraction of each component in the system is of the same order of magnitude. These and other novel hybrid materials described herein are investigated for use in a variety of golf ball components that include, but are not limited to, golf ball centers, cores, layers, covers, and coating materials and/or blends, continuous or non-continuous layers, thick of thin films, fillers, fibers, flakes, windings, adhesives, coupling agents, compatibilizers, composites, reinforcements, and inks.

SUMMARY OF THE INVENTION

The present invention is directed to a golf ball comprising a core and a cover layer, wherein at least one of the core or cover layer comprises a hybrid material. The hybrid materials may include glass ionomers, resin-modified glass ionomers, fatty acid-modified glass ionomers, ormocers, inorganic-organic materials, silicon ionomers, dental cements or restorative compositions, polymerizable cements, ionomer cements, metal-oxide polymer composites, ionomer cements, aluminofluorosilicate glasses, fluoroaluminosilicate glass powders, polyalkenoate cements, flexible composites, and blends thereof.

According to this invention, the fatty acid-modified glass ionomers include (a) those ionomers neutralized with an inorganic metal and then post-blended with a fatty acid or fatty acid salt; (b) those ionomers neutralized only with the metal salt of a fatty acid; and (c) any blend of (a) and (b) or process for forming that incorporates some partial or full method used to form (a) and (b).

In one embodiment of this invention, the fatty acid or salt thereof is present in an amount sufficient to neutralize the ionomers by at least about 90%. In a preferred embodiment, the fatty acid or salt thereof is present in an amount sufficient to neutralize the ionomers by about 100%. Metal cations that can be used are barium, lithium, sodium, zinc, bismuth, chromium, cobalt, copper, potassium, strontium, titanium, tungsten, magnesium, cesium, iron, nickel, silver, aluminum, tin, calcium, manganese and mixtures thereof.

The present invention is directed to a golf ball comprising a core and a cover layer, wherein at least one of the core or cover layer comprises a hybrid material, wherein the hybrid material comprises a fatty acid-modified glass ionomer. The fatty acid is selected from a group consisting of butyric acid, caproic acid, caprylic acid, capric acid, lauric acid, myristic acid, palmitic acid, margaric acid, stearic acid, arachidic acid, behenic acid, lignoceric acid, palmitoleic acid, petroselinic acid, oleic acid, elaidic acid, cis-vaccenic acid, trans-vaccenic acid, gadoleic acid, gondoic acid, erucic acid, nervonic acid, linoleic acid, γ-linolenic acid, α-linolenic acid, stearidonic acid, dihomo-γ-linolenic acid, arachidonic acid, timnodonic acid, clupandonic acid, dimers, trimers and mixture thereof.

In one embodiment of the present invention, the fatty acid-modified glass ionomer is made at least in part by neutralizing the glass ionomer with an inorganic metal cation and post-blended with a fatty acid or a fatty acid salt from about 80% to about 100%. The inorganic metal cation comprises lithium, sodium, magnesium, zinc and a mixture thereof. In another embodiment, the fatty acid salt comprises barium, lithium, sodium, zinc, bismuth, chromium, cobalt, copper, potassium, strontium, titanium, tungsten, magnesium, cesium, iron, nickel, silver, aluminum, tin, calcium, manganese and mixtures thereof.

In another embodiment of this invention, the fatty acid-modified glass ionomer is made at least in part by neutralizing the glass ionomer with a fatty acid salt from about 80% to about 100%. The fatty acid salt comprises barium, lithium, sodium, zinc, bismuth, chromium, cobalt, copper, potassium, strontium, titanium, tungsten, magnesium, cesium, iron, nickel, silver, aluminum, tin, calcium, manganese and mixtures thereof.

According to one particular aspect of this invention, the core of the golf ball comprises a center and an outer core layer. In one embodiment of the invention, at least one of the center or the core layer comprises the hybrid material.

According to another aspect of this invention, the cover of the golf ball comprises an inner cover layer and an outer cover layer. In one embodiment of the invention, at least one of the inner or outer cover layers comprises the hybrid material. In another embodiment of the invention, at least one of the inner or outer cover layer has a thickness of less than about 0.05 inches.

According to another aspect of this invention, the core of the golf ball has an outer diameter of at least about 1.55 inches. In one embodiment of the invention, the core has an outer diameter of between about 1.57 inches and about 1.62 inches.

According to another aspect of this invention, the golf ball comprises thick or thin films, fillers, fibers, flakes, particulates, windings, adhesives, coupling agents, compatibilizers, composites, short or long fibrous reinforcements, and inks formed of the hybrid material.

According to another aspect of this invention, the hybrid materials are present in the fillers in the golf ball. In one embodiment of the invention, the fillers in the golf ball comprise fibers, flakes, particulates, short or long fibrous reinforcement.

DETAILED DESCRIPTION OF THE INVENTION

The golf balls of the present invention may comprise any of a variety of constructions, from a simple one-piece solid ball, to a two-piece ball formed of a core and cover, to a three piece dual core single cover to any multi-piece construction, but preferably include a core formed of a center and at least one outer core layer and a cover formed of an outer cover layer and at least one inner cover layer. The core and/or the cover layers may be formed of more than one layer and an intermediate or mantle layer may be disposed between the core and the cover of the golf ball. The innermost portion of the core, while preferably solid, may be a hollow or a liquid-, gel-, or air-filled sphere. As with the core, the cover layers may also comprise a plurality of layers, at least one of which may be an adhesive or coupling layer. The layers may be continuous or non-continuous (i.e., grid-like). The core may also comprise a solid or liquid filled center around which many yards of a tensioned elastomeric material are wound.

Any of the core, intermediate layer, or cover components may be formed of or include a hybrid material. Components include golf ball centers, cores, layers, covers, and coating materials and/or blends. The hybrid materials include, but are not limited to, glass ionomers, ormocers, and other inorganic-organic materials. Ormocers are composite materials formed of ceramic and polymer networks that combine and interpenetrate with one another. Ormocers may be generally classified as one, either organic- or inorganic-doped systems typically based on one major phase containing a second one in a relatively low amount; and two, either organic- or inorganic-doped systems in which the fraction of each component in the system is of the same order of magnitude. The different organic-inorganic hybrids can be further classified into two broad families: one, where one of the hybrid components can be molecules, oligomers, polymers entrapped within a network of the other component (where weak interactions between the hosting "network" and the entrapped species, such as H-bonding, electrostatic or van der waals forces, predominate), and two, wherein the organic-inorganic parts are chemically bonded by covalent or ionic bonds. Preferably, the golf ball components comprise this second class of hybrid materials.

The hybrid materials of the present invention may be described by a number of lexicons including, but not limited to, glass ionomers, resin-modified glass ionomers, fatty acid-modified glass ionomers, silicon ionomers, dental cements or restorative compositions, polymerizable cements, metal-oxide polymer composites, and ionomer cements. One advantage of these materials that the present invention is intended to make use of is their ability to cure in the presence of moisture and their moisture resistance in the cured state. Additionally, blends of these materials, including blends of polyolefinic ionomers (undried) and glass ionomers offer desirable characteristics for the golf ball components, such as toughness, stiffness, and high density.

Compositions comprising a liquid material and a powder material, wherein the liquid material comprises 4-methacryloxyethyl trimellitic acid and water and the powder material comprises a powdered fluoroalumino silicate glass or a powdered metal oxide containing zinc oxide as the major component are also suitable. Other suitable materials include aluminofluorosilicate glasses having the following features: a) a ratio of Al (calculated as $Al_2O_3$) to Si (calculated as $SiO_2$) of 0.57–1.12 by mass; b) a total content of Mg (calculated as MgO) and Ba (calculated as BaO) of 29–36% by mass; c) a ratio of Mg (calculated as MgO) to Ba (calculated as BaO) of 0.028–0.32 by mass; d) a content of P (calculated as $P_2O_5$) of 2–10% by mass. The glass according to the invention has a high radiopacity, and the refractive index, nD, for visible light can be adjusted by varying the phosphorus content.

Fluoroaluminosilicate glass powders having a specific gravity of 2.4 to about 4.0, a mean particle size of 0.02 to about 4 µm, and a BET specific surface area of 2.5 to about 6.0 $m^2$/g are also suitable. Preferably they have a maximum particle size of less than 4 µm and contain 10 to about 21% by weight of $Al^{3+}$, about 21% by weight of $Si^{4+}$, about 20% by weight of $F^-$, and about 34% by weight in total of $Sr^{2+}$ and/or $Ca^{2+}$ in its components.

Glass powders for glass ionomer cements are also suitable hybrid materials. These powders have a shape in which a major axis length is from 3 to 1,000 times a minor axis length, in a glass powder for glass ionomer cement. The glass powder for glass ionomer cement having a shape in which a major axis length is from 3 to 1,000 times a minor axis length is a fibrous glass having a minor axis length of from 0.1 to 100 µm and a major axis length of 500 µm or less, and its content is within a range of from 0.1 to 80% by weight.

Other acceptable hybrid materials include a polymerizable composition comprising a polymerizable resin composition; and a filler composition comprising a bound, nanostructured colloidal silica. These composites comprise a resin composition and a filler composition, wherein the filler composition comprises a nanostructured, bound silica, preferably in the form of nanosized particles having their largest dimensions in the range from about 10 to about 50 nm. Silica particles are preferably bound so as to result in chains having lengths in the range from about 50 nm to about 400 nm. Resin compositions are well known in the art, generally comprising viscous acrylate or methacrylate monomers.

Other resin materials include, but are not limited to, urethane dimethacrylate, and diurethane dimethacrylate. A useful oligomer is a polycarbonate dimethacrylate which is the condensation product of two parts of a hydroxyalkylmethacrylate and 1 part of a bis(chloroformate). Another advantageous resin having lower water sorption characteristics is an ethoxylated bisphenol A dimethacrylate. Other resin compositions suitable for use with glass ionomer cements, include polycarboxylic acids such as homo- and copolymers of acrylic acid and/or itaconic acid.

In addition to the aforementioned monomers and oligomers, the resin compositions can further include a diluent acrylate or methacrylate monomer to increase the surface wettability of the composition and/or to decrease the viscosity of the polymerization medium. Suitable diluent monomers include those known in the art such as hydroxy alkyl methacrylates, for example 2-hydroxyethyl methacrylate and 2-hydroxypropyl methacrylate; ethylene glycol methacrylates, including ethylene glycol methacrylate, diethylene glycol methacrylate, tri(ethylene glycol) dimethacrylate and tetra(ethylene glycol) dimethacrylate; and diol dimethacrylates such as butanedimethacrylate, dodecanedimethacryalte, or 1,6-hexanedioldimethacrylate. Tri(ethylene glycol) dimethacrylate is particularly preferred.

The more viscous monomers, i.e., UDMA, Bis-GMA, and the like are generally present in an amount in the range from 30 to about 100 percent by weight of the total resin composition, preferably in an amount in the range from about 50 to about 90 percent by weight of the total resin composition, and even more preferably in an amount from about 50 to about 80 percent by weight of the total resin composition. Diluent monomers, when present, are incorporated into the resin composition in an amount from about 1 to about 70 weight percent of the total resin composition. These materials and other suitable hybrid materials are described in U.S. Pat. No. 6,417,246, the disclosure of which is incorporated herein, in its entirety, by express reference thereto.

Ideal hybrid materials are comprised of about 22% by weight alumina, about 78% by weight silica, about 2% by weight silicon carbide, and about 2.85% by weight boron nitride with less than 1% cristobalite contamination. One preferred embodiment is comprised of a binder and a filler wherein said filler is comprised of about 1% to about 50% by weight alumina, from about 50% by weight to about 98% by weight silica, and boron. Another preferred embodiment is comprised of: (1) from about 15% to about 30% by weight alumina fiber; (2) from about 65% to about 85% by weight silica fiber; (3) from about 1% to about 3% by weight silicon carbide; and (4) from about 1% to about 5% by weight boron nitride. Another more preferred fused-fibrous composition for the filler is as follows: (1) about 21% by weight alumina fiber; (2) about 74% by weight silica fiber; (3) about 2% by weight silicon carbide; and (4) about 2.85% by weight boron nitride. Preferably, the hybrid materials of the present invention are comprised of alumina and silica fibers in a ratio of 22:78.

Flexible composite hybrid compositions are provided comprising (a) about 2 to 15 weight percent of a flexible monomer portion comprising one or more flexible co-monomers of the general formula $R^1$—O—$[(CH$—$R^2)_n$—O—$]_z$—$R^3$ wherein $R^1$ and $R^3$ are acrylate or methacrylate functional groups, $R^2$ is selected from the group of hydrogen, methyl and ethyl, n is from 3 to 5 and z is from about 3 to about 20 and the monomers have average molecular weights from at least about 300 or higher, (b) about 30 to about 80 weight percent of a filler portion, (c) about 18 to 60 weight percent of a comonomer portion comprising one or more co-monomers capable of polymerizing with the flexible monomer portion, and (d) a polymerization catalyst system for polymerizing and hardening the composition.

Suitable glass ionomer cements are generally comprised of a powder component containing aluminosilicate and a liquid portion. Often the liquid portion is expressed as containing polyacrylic acid, polymaleic acid, polyitaconic acid, or a copolymer of at least two of the acids. The liquid portion may also comprise carboxylate polymers or carboxylic acid polymeric structures, such as those including acrylic acid, maleic acid, crotonic acid, isocrotonic acid, methacrylic acid, sorbic acid, cinnamic acid, fumaric acids, and the like. In most glass ionomer cements, the primary reactions which cause the glass ionomer cement to harden is cross-linking, i.e., the cross-linking of polycarboxylate chains by metal ions from the glass. Also, during setting, the acids of the glass ionomer cement dissolve the glass structure to release metal constituents of the glass. Metal carboxylates are formed during the setting process. This may be distinguished from the primary setting reactions of acrylic cements which are other forms of polymerization reactions. Though other forms of polymerization reactions may occur in glass ionomer cements, these reactions are secondary to the cross-linking reactions of the glass ionomer cement.

Glass-ionomer cements are acid-base reaction cements that typically set by the interaction of an aqueous solution of a polymeric acid with an acid-degradable glass. The principal setting reaction is the slow neutralization of the acidic polymer solution to form a polysalt matrix. The acid is typically a polycarboxylic acid (often polyacrylic acid) and the glass is typically a fluoroaluminosilicate. The setting reaction begins as soon as the components are mixed, and the set material has residual glass particles embedded in interconnected polysalt and silica matrices. Resin-modified glass-ionomer cements were introduced with the intention of overcoming the problems associated with the conventional glass-ionomer, e.g., uncontrolled chemical set and tendency towards brittle fracture, whilst still retaining its advantages, e.g., fluoride release and adhesion. One attempt to achieve this advocated simply replacing some of the water in a conventional glass-ionomer cement with a hydrophilic monomer. Another approach also replaced some of the water in the formulation, but in addition modified the polymeric acid so that some of the acid groups were replaced with unsaturated species, so that the polymeric acid could also take part in the polymerization reaction.

Resin-modified glass-ionomers have two setting reactions: the acid-base reaction of the glass-ionomer, and the polymerization of the composite resin. The monomer systems used in resin-modified glass-ionomers are not generally the same as those in composite resins. This is because the monomer must be compatible with the aqueous acid-base reaction of the glass-monomer components.

Another aspect of the present invention is directed to golf balls comprising fatty acid-modified glass ionomers. The fatty acid-modified glass ionomers include (a) those ionomers neutralized with an inorganic metal and then post-blended with a fatty acid or fatty acid salt; (b) those ionomers neutralized only with the metal salt of a fatty acid; and (c) any blend of (a) and (b) or process for forming that incorporates some partial or full method used to form (a) and (b).

The mechanism responsible for the enhanced resilience in the fatty acid-modified ionomers is believed to be ionic plasticization, which is also demonstrated by the fatty acid-modified polyethyle-acrylic or methacrylic acid ionomers disclosed in U.S. application Ser. No. 10/118,719, filed Apr. 9, 2002, which is incorporated herein by reference in its entirety. In U.S. Pat. No. 6,613,812, which is also incorporated herein by reference in its entirety, fatty acids, dimer thereof, or trimer thereof, are parts of a dental composition.

Fatty acids are organic compounds containing 4 to 24 carbon atoms, having a hydrocarbon chain and a terminal carboxylic acid group. The hydrocarbon chain may be saturated, monounsaturated or monoenoic, and polyunsaturated or polyenoic. (J. Beare-Rogers, A. Dieffenbacher, and J. V. Holm, Pure Appl. Chem. Vol. 73, No. 4, pp. 685–744, 2001.) Dimers and trimers of the fatty acids can also be used in this embodiment of this invention.

Examples of saturated fatty acids are butyric (butanoic) acid, caproic (hexanoic) acid, caprylic (octanoic) acid, capric (decanoic) acid, lauric (dodecanoic) acid, myristic (tetradecanoic) acid, palmitic (hexadecanoic) acid, margaric (heptadecanoic) acid, stearic (octadecanoic) acid, arachidic (icosanoic) acid, behenic (docosanoic) acid, and lignoceric (tetracosanoic) acid.

Examples of monounsaturated fatty acids, or monoenoic fatty acids, are palmitoleic (cis-hexadec-9-enoic) acid, petroselinic (cis-octadec-6-enoic) acid, oleic (cis-octadec-9-enoic) acid, elaidic (trans-octadec-9-enoic) acid, cis-vaccenic (cis-octadec-11-enoic) acid, trans-vaccenic (trans-octadec-11-enoic) acid, gadoleic (cis-icos-9-enoic) acid, gondoic (cis-icos-11-enoic) acid, erucic (cis-docos-13-enoic) acid, and nervonic (cis-tetracos-15-enoic acid).

Examples of polyunsaturated fatty acids, or polyenoic fatty acids, are linoleic (cis,cis-octadeca-9,12-dienoi) acid, γ-linolenic (all-cis-octadeca-6,9,12-trienoic) acid, α-linolenic (all-cis-octadeca-9,12,15-trienoic) acid, stearidonic (all-cis-octadeca-6,9,12,15-tetraenoic) acid, dihomo-γ-linolenic (all-cis-icosa-8,11,14-trienoic) acid, arachidonic (all-cis-icosa-5,8,11,14-tetraenoic) acid, timnodonic (all-cis-icosa-5,8,11,14,17-pentaenoic) acid, and clupandonic (all-cis-docosa-4,7,10,13,16,19-hexaenoic) acid.

In one embodiment of the invention, the fatty acids are caprylic acid, capric acid, stearic acid, and oleic acid, and their dimers, trimers and mixtures thereof. In another embodiment of the invention, the fatty acids are oleic acid, and its dimer, trimer and mixtures thereof.

According to another aspect of this invention, neutralization of the glass ionomers can be accomplished by (a) using a metal cation, before blending with a fatty acid or salt thereof; (b) using only a salt of a fatty acid; and (c) using a mixture of the processes in (a) and (b).

In one embodiment of this invention, the glass ionomers are neutralized first with a metal cation, such as barium, lithium, sodium, zinc, bismuth, chromium, cobalt, copper, potassium, strontium, titanium, tungsten, magnesium, cesium, iron, nickel, silver, aluminum, tin, calcium, manganese and mixtures thereof, before blending with a fatty acid or a salt of a fatty acid such as barium, lithium, sodium, zinc, bismuth, chromium, cobalt, copper, potassium, strontium, titanium, tungsten, magnesium, cesium, iron, nickel, silver, aluminum, tin, calcium, and manganese, as well as mixtures thereof. In one embodiment, the metal cation, the fatty acid or salt thereof are present in an amount sufficient to neutralize the glass ionomers by at least about 80%. In another embodiment, the metal cation, the fatty acid or salt thereof are present in an amount sufficient to neutralize the glass ionomers by about 90 to about 100%. In another embodiment, the metal cation, the fatty acid or salt thereof are present in an amount sufficient to neutralize the glass ionomers by about 100%.

In another embodiment of this invention, the glass ionomers are neutralized only with a salt of a fatty acid, such as barium, lithium, sodium, zinc, bismuth, chromium, cobalt, copper, potassium, strontium, titanium, tungsten, magnesium, cesium, iron, nickel, silver, aluminum, tin, calcium, and manganese, as well as mixtures thereof. In one embodiment, the salt of the fatty acid is present in an amount sufficient to neutralize the glass ionomers by at least about 80%. In another embodiment, the salt of the fatty acid is present in an amount sufficient to neutralize the glass ionomers by about 90 to about 100%. In another embodiment, the salt of the fatty acid is present in an amount sufficient to neutralize the glass ionomers by about 100%.

In another embodiment, the glass ionomers are neutralized by a mixture of the process of (a) using a metal cation, before blending with a fatty acid or salt thereof, and (b) using only a salt of a fatty acid. In this embodiment, the metal cation, fatty acid or salt thereof are present in an amount sufficient to neutralize the glass ionomers by at least about 80%. In another embodiment, the cation, the fatty acid or salt thereof are present in an amount sufficient to neutralize the glass ionomers by about 90 to about 100%. In another embodiment, the cation, the fatty acid, or salt thereof are present in an amount sufficient to neutralize the glass ionomers by about 100%.

Polyalkenoate cements are also suitable, such as glass-ionomers and zinc polycarboxylate. Both of these cements are formed by the neutralization reaction of polyacids such as poly(acrylic acid), PAA, with calcium alumino silicate and with zinc oxide respectively. Therefore, the cations responsible for the neutralization reactions are Zn in the case of the former cement and Ca and Al in the case of the glass-ionomer cement. An ideal combined polyalkenoate cement would i) retain the generic properties of polyalkenoate cements—adhesion and fluoride release; ii) possess the individual advantages of both the glass-ionomer and zinc polycarboxylate cements; iii) possess the disadvantages of neither of the cements, viz, for glass-ionomers, poor flexural strength and wear and early susceptibility to water dissolution; for zinc polycarboxylates, poor wetting and low compressive strengths.

Hybrid resin compositions according to the present invention comprise (A) a reaction product between an aluminosilicate glass powder containing at least one element selected from Ca, Sr, and Ra and an organic acid containing one or more carboxyl groups in one molecule thereof, (B) a methanol-insoluble polymer, (C) a monomer containing at least one unsaturated double bond and having no acidic group, and (D) a polymerization initiator, and optionally (E) a filler which is added, if necessary.

Ionomer cements in which the powder used in the cement is an ion-leachable glass, such as those based on calcium aluminosilicate glasses, or more recently, borate glasses, are preferred hybrid materials. In the setting reaction, the powder behaves like a base and reacts with the acidic polyelectrolyte, i.e., ionomer, to form a metal polysalt which acts as the binding matrix. Water serves as a reaction medium and allows the transport of ions in what is essentially an ionic reaction. The setting reaction is therefore characterized as a chemical cure system that proceeds automatically upon mixing the ionomer and powder in the presence of water. The cements set to a gel-like state within a few minutes and rapidly harden to develop strength. Chelating agents, such as tartaric acid, have been described as useful for modifying the rate of setting, e.g., to provide longer working times for the cements.

Hybrid composite materials may be characterized by a substrate and by a nano-composite which is in functional contact with the substrate and is obtainable by surface modification of a) colloidal inorganic particles with b) one or more silanes of the general formula (I) $R_x$—Si—$A_{4-x}$ where the radicals A are identical or different and are hydroxyl groups or groups which can be removed hydrolytically, except methoxy, the radicals R are identical or different and are groups which cannot be removed hydrolytically and x is 0, 1, 2 or 3, where $x \geq 1$ in at least 50 mol % of the silanes; under the conditions of the sol-gel process with a below-stoichiometric amount of water, based on the hydrolysable groups which are present, with formation of a nano-composite sol, and further hydrolysis and condensation of the nano-composite sol, if desired, before it is brought into contact with the substrate, followed by curing, said substrate not being a glass or mineral fiber or a vegetable material.

Ormocers, which can be obtained by the hydrolytic condensation of one or more silicon compounds, and the subsequent polymerization of organic monomers, wherein at least one silicon compound comprises vinyl ether radicals of formula (I):

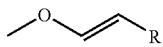

wherein R represents hydrogen, methyl, or ethyl, are also suitable. It is possible to make ormocers by the hydrolytic condensation of one or more silicon compounds and subsequently, the polymerization of organic monomers whose organic network can be cured at a high rate, without thereby causing a high volume contraction.

Low-viscosity hybrid materials contain a non-settling nano-scale filler. The filler forms a stable sol with low-viscosity materials and the filler may be prepared by surface treatment of fillers having a primary particle size of from about 1 to about 100 nm.

Interwoven organic-inorganic solid composite materials are also suitable. These materials are formed of a mixture of a precursor polymer, an alcohol, and a catalyst system. The precursor polymer has an inorganic polymer backbone of Si or Ti with linkages to polymerizable alkoxide groups. The catalyst system promotes the hydrolysis and polymerization of the alkoxide groups and the condensation of the inorganic backbone to form a solid interwoven network with the organic polymer chains interpenetrating the network.

These and other novel hybrid materials described herein are investigated for use in a variety of golf ball components that include, but are not limited to, golf ball centers, cores, layers, covers, and coating materials and/or blends, continuous or non-continuous layers such as those described in U.S. application Ser. No. 09/815,753 (which are incorporated herein, in their entirety, by express reference thereto), thick or thin films, fillers, fibers, flakes, particulates, windings, adhesives, coupling agents, compatibilizers, composites, short or long fibrous reinforcements, and inks, preferably in a thermoset or thermoplastic matrix wherein the hybrid material comprises from about 1 to about 99 weight percent of the composition.

The glass ionomers, fatty acid-modified glass ionomers, ormocers or other hybrid materials of the present invention may be useful as additives, fillers, or reinforcements in any number of materials and/or portions of a golf ball. More preferably, the hybrids of the present invention are present in outer core layers, inner and outer cover layers, and coatings, which include coatings applied over the core (i.e., solid, wound, hollow, foam, liquid, or gel), and/or over a core layer, cover layer, or conventional top-coat. If used in a coating, preferably, the hybrid materials are incorporated into one or more layers of a primer or top-coat.

If the hybrid materials are used in a core layer, they may be used alone or in blends with conventional polybutadiene rubber thermoset materials as a single or dual core, as well as blends with many conventional thermoplastic or thermoset materials in a multi-piece core. A preferred use of the hybrid materials of the present invention are blends with polyurethanes, polyurethane-ureas, polyurea-urethanes, polyureas, polyurethane-ionomers, epoxies, silicones, and unsaturated polyesters as inner or outer cover materials. These layers may be formed in a variety of methods, however preferably they are applied (i.e., sprayed, dipped, etc.) or molded using reaction injection molding, casting, laminating, or otherwise forming a thermoplastic or preferably thermoset layer of polymer from liquid reactive components. The hybrid materials may also be blended with thermoplastic composites wherein the thermoplastic materials comprise ionomers, polyurethanes, polyurethane-ureas, polyurea-urethanes, polyureas, metallocenes (including grafted metallocenes), polyamides, PEBAX®, HYTREL®, and other suitable materials, such as those described in U.S. Pat. Nos. 6,149,535 and 6,152,834, which are incorporated herein, in their entirety, by express reference thereto.

Suitable polyurethane-type materials for blending with the hybrid materials of the present invention or which by any cover layer, preferably outer cover layers may be formed if not blended with the hybrid materials include, but are not limited to, polyurethanes, polyurethane-ureas, polyurea-urethanes, polyureas, or epoxies, that generally comprise the reaction product of at least one polyisocyanate, polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("$H_{12}$MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate; dodecane-1,12-diisocyanate; cyclobutane-1,3-diisocyanate; cyclohexane-1,3-diisocyanate; cyclohexane-1,4- diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Preferably, the polyisocyanate includes MDI, PPDI, TDI, or a mixture thereof. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The polyisocyanate should have less than about 14% unreacted NCO groups. Preferably, the at least one polyisocyanate has no greater than about 7.5% NCO, and more preferably, less than about 7.0%. It is well understood in the art that the hardness of polyurethane can be correlated to the percent of unreacted NCO groups.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes a polyether polyol, such as polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups.

Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups.

Polyamine curatives are also suitable for use in polyurethane covers. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene- 2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2', 3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE® 300, commercially available from Albermarle Corporation of Baton Rouge, La. Suitable polyamine curatives include both primary and secondary amines.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl)ether; hydroquinone-di-(β-hydroxyethyl)ether; and mixtures thereof. Preferred hydroxy-terminated curatives include 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol, and mixtures thereof.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a particularly preferred embodiment of the present invention, saturated (aliphatic) polyurethanes are used to form cover layers, preferably the outer cover layer. The thermoset polyurethanes may be castable, reaction injection moldable, sprayable, or applied in a laminate form or by any technical known in the art. The thermoplastic polyurethanes may be processed using any number of compression or injection techniques. In one embodiment, the saturated polyurethanes are substantially free of aromatic groups or moieties.

Saturated diisocyanates which can be used include, but are not limited to, ethylene diisocyanate; propylene-1,2-diisocyanate; tetramethylene-1,4-diisocyanate; 1,6-hexamethylene-diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate ("IPDI"); methyl cyclohexylene diisocyanate; triisocyanate of HDI; triisocyanate of 2,2,4-trimethyl-1,6-hexane diisocyanate ("TMDI"). The most preferred saturated diisocyanates are 4,4'-dicyclohexylmethane diisocyanate and isophorone diisocyanate ("IPDI").

Saturated polyols which are appropriate for use in this invention include, but are not limited to, polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol initiated polycaprolactone, 1,4-butanediol initiated polycaprolactone, 1,6-hexanediol initiated polycaprolactone; trimethylol propane initiated polycaprolactone, neopentyl glycol initiated polycaprolactone, PTMEG-initiated polycaprolactone. The most preferred saturated polyols are PTMEG and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine, ethylene diamine, diethylene triamine, triethylene tetramine, tetraethylene pentamine, 4,4'-dicyclohexylmethane diamine, 2,2,4-trimethyl-1,6-hexanediamine; 2,4, 4-trimethyl-1,6-hexanediamine; diethyleneglycol di-(aminopropyl)ether; 4,4'-bis-(sec-butylamino)-dicyclohexylmethane; 1,2-bis-(sec-butylamino) cyclohexane; 1,4-bis-(sec-butylamino)cyclohexane; isophorone diamine, hexamethylene diamine, propylene diamine, 1-methyl-2,4-cyclohexyl diamine, 1-methyl-2,6-cyclohexyl diamine, 1,3-diaminopropane, dimethylamino propylamine, diethylamino propylamine, imido-bis-propylamine, isomers and mixtures of isomers of diaminocyclohexane, monoethanolamine, diethanolamine, triethanolamine, monoisopropanolamine, and diisopropanolamine. The most preferred saturated curatives are 1,4-butanediol, 1,4-cyclohexyldimethylol and 4,4'-bis-(sec-butylamino)-dicyclohexylmethane.

Suitable catalysts include, but are not limited to bismuth catalyst, oleic acid, triethylenediamine (DABCO®-33LV), di-butyltin dilaurate (DABCO®-T12) and acetic acid. The most preferred catalyst is di-butyltin dilaurate (DABCO®-T12). DABCO® materials are manufactured by Air Products and Chemicals, Inc.

It is well known in the art that if the saturated polyurethane materials are to be blended with other thermoplastics, care must be taken in the formulation process so as to produce an end product which is thermoplastic in nature. Thermoplastic materials may be blended with other thermoplastic materials, but thermosetting materials are difficult if not impossible to blend homogeneously after the thermosetting materials are formed. Preferably, the saturated polyurethane comprises from about 1 to about 100%, more preferably from about 10 to about 75% of the cover composition and/or the intermediate layer composition. About 90 to about 10%, more preferably from about 90 to about 25% of the cover and/or the intermediate layer composition is comprised of one or more other polymers and/or other materials as described below. Such polymers include, but are not limited to polyurethane/polyurea ionomers, polyurethanes or polyureas, epoxy resins, polyethylenes, polyamides and polyesters, polycarbonates and polyacrylin. Unless otherwise stated herein, all percentages are given in percent by weight of the total composition of the golf ball layer in question.

Polyurethane prepolymers are produced by combining at least one polyol, such as a polyether, polycaprolactone, polycarbonate or a polyester, and at least one isocyanate. Thermosetting polyurethanes are obtained by curing at least one polyurethane prepolymer with a curing agent selected from a polyamine, triol or tetraol. Thermoplastic polyurethanes are obtained by curing at least one polyurethane prepolymer with a diol curing agent. The choice of the curatives is critical because some urethane elastomers that are cured with a diol and/or blends of diols do not produce urethane elastomers with the impact resistance required in a golf ball cover. Blending the polyamine curatives with diol cured urethane elastomeric formulations leads to the production of thermoset urethanes with improved impact and cut resistance. Other suitable thermoplastic polyurethane resins include those disclosed in U.S. Pat. No. 6,235,830, which is incorporated herein, in its entirety, by express reference thereto.

The hybrid materials may be included in the golf ball cores or, if the hybrid materials are used in other components of the golf ball, the cores may be formed of conventional materials. The cores are substantially solid and form a center of a golf ball. The cores may also contain a liquid-, gas-, of gel-filled center. The cores of the present invention are surrounded by a single-layer or multiple-layer core or cover layers and are, optionally, painted, especially when a non-aliphatic or non-saturated polyurethane cover is employed. The balls may also include intermediate layers of molded or wound material as known by those of ordinary skill in the art. The present invention is therefore not limited to incorporating the cores into any particular golf ball construction and the present cores can be used in any constructions.

The materials for solid cores include compositions having a base rubber, a crosslinking agent, a filler, and a co-crosslinking or initiator agent, and preferably, a halogenated organosulfur compound. The base rubber typically includes natural or synthetic rubbers. A preferred base rubber is 1,4-polybutadiene having a cis-structure of at least 40%, more preferably at least about 90%, and most preferably at least about 95%. Most preferably, the base rubber comprises high-Mooney-viscosity rubber. Preferably, the base rubber has a Mooney viscosity greater than about 35, more preferably greater than about 50. Preferably, the polybutadiene rubber has a molecular weight greater than about 400,000 and a polydispersity of no greater than about 2. Examples of desirable polybutadiene rubbers include BUNA® CB22 and BUNA® CB23, commercially available from Bayer of Akron, Ohio.; UBEPOL® 360L and UBEPOL® 150L, commercially available from UBE Industries of Tokyo, Japan; and CARIFLEX® BCP820 and CARIFLEX® BCP824, commercially available from Shell of Houston, Tex. If desired, the polybutadiene can also be mixed with other elastomers known in the art such as natural rubber, polyisoprene rubber and/or styrene-butadiene rubber in order to modify the properties of the core.

The crosslinking agent includes a metal salt, such as a zinc salt or a magnesium unsaturated fatty acid, such as acrylic or methacrylic acid, having 3 to 8 carbon atoms. Examples include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof. The crosslinking agent is typically present in an amount greater than about 10 parts per hundred ("pph") parts of the base polymer, preferably from about 20 to 40 pph of the base polymer, more preferably from about 25 to 35 pph of the base polymer.

The initiator agent can be any known polymerization initiator which decomposes during the cure cycle. Suitable initiators include organic peroxide compounds, such as dicumyl peroxide; 1,1-di(t-butylperoxy) 3,3,5-trimethyl cyclohexane; α,α-bis (t-butylperoxy) diisopropylbenzene; 2,5-dimethyl-2,5 di(t-butylperoxy) hexane; di-t-butyl peroxide; and mixtures thereof. Other examples include, but are not limited to, VAROX® 231XL and Varox® DCP-R, commercially available from Elf Atochem of Philadelphia, Pa.; PERKODOX ® BC and PERKODOX ® 14, commercially available from Akzo Nobel of Chicago, Ill.; and ELASTOCHEM® DCP-70, commercially available from Rhein Chemie of Trenton, N.J.

It is well known that peroxides are available in a variety of forms having different activity. The activity is typically defined by the "active oxygen content." For example, PERKODOX® BC peroxide is 98% active and has an active oxygen content of 5.80%, whereas PERKODOX® DCP-70 is 70% active and has an active oxygen content of 4.18%. If the peroxide is present in pure form, it is preferably present in an amount of at least about 0.25 pph, more preferably between about 0.35 pph and about 2.5 pph, and most preferably between about 0.5 pph and about 2 pph. Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 pph of a pure peroxide is equivalent (at the same percent active oxygen content) to 4 pph of a concentrate peroxide that is 50% active (i.e., 2 divided by 0.5=4).

The halogenated organosulfur compounds of the present invention include, but are not limited to those having the following general formula:

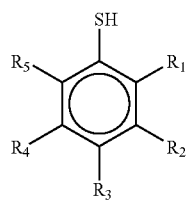

where $R_1$-$R_5$ can be $C_1$-$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol; 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol;. 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts. Preferably, the halogenated organosulfur compound is pentachlorothiophenol, which is commercially available in neat form or under the tradename STRUKTOL® A95, a clay-based carrier containing the sulfur compound pentachlorothiophenol loaded at 45 percent (correlating to 2.4 parts PCTP). STRUKTOL® A95 is commercially available from Struktol Company of America of Stow, Ohio. PCTP is commercially available in neat form from eChinachem of San Francisco, Calif. and in the salt form from eChinachem of San Francisco, Calif. Most preferably, the halogenated organosulfur compound is the zinc salt of pentachlorothiophenol, which is commercially available from eChinachem of San Francisco, Calif. The halogenated organosulfur compounds of the present invention are preferably present in an amount greater than about 2.2 pph, more preferably between about 2.3 pph and about 5 pph, and most preferably between about 2.3 and about 4 pph.

Fillers typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like. Fillers may be added to one or more portions of the golf ball and typically may include processing aids or compounds to affect rheological and mixing properties, density-modifying fillers, fillers to improve tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The invention also includes, if desired, a method to convert the cis-isomer of the polybutadiene resilient polymer component to the trans-isomer during a molding cycle and to form a golf ball. A variety of methods and materials suitable for cis-to-trans conversion have been disclosed in U.S. Pat. No. 6,162,135 and U.S. application Ser. No. 09/461,736, filed Dec. 16, 1999; Ser. No. 09/458,676, filed Dec. 10, 1999; and Ser. No. 09/461,421, filed Dec. 16, 1999, each of which are incorporated herein, in their entirety, by reference.

The materials used in forming either the golf ball center or any portion of the core, in accordance with the invention, may be combined to form a mixture by any type of mixing known to one of ordinary skill in the art. Suitable types of mixing include single pass and multi-pass mixing. Suitable mixing equipment is well known to those of ordinary skill in the art, and such equipment may include a Banbury mixer, a two-roll mill, or a twin screw extruder.

Conventional mixing speeds for combining polymers are typically used. The mixing temperature depends upon the type of polymer components, and more importantly, on the type of free-radical initiator. Suitable mixing speeds and temperatures are well-known to those of ordinary skill in the art, or may be readily determined without undue experimentation.

The mixture can be subjected to, e.g., a compression or injection molding process, to obtain solid spheres for the center or hemispherical shells for forming an intermediate layer. The temperature and duration of the molding cycle are selected based upon reactivity of the mixture. The molding cycle may have a single step of molding the mixture at a single temperature for a fixed time duration. The molding cycle may also include a two-step process, in which the polymer mixture is held in the mold at an initial temperature for an initial duration of time, followed by holding at a second, typically higher temperature for a second duration of time. In a preferred embodiment of the current invention, a single-step cure cycle is employed. The materials used in forming either the golf ball center or any portion of the core, in accordance with the invention, may be combined to form a golf ball by an injection molding process, which is also well-known to one of ordinary skill in the art. Although the curing time depends on the various materials selected, those of ordinary skill in the art will be readily able to adjust the curing time upward or downward based on the particular materials used and the discussion herein.

The golf ball layers of the present invention can likewise include one or more homopolymeric or copolymeric materials, such as:

(1) Vinyl resins, such as those formed by the. polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN®, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX®, sold by ELF Atochem of Philadelphia, Pa.;

(8) Polyphenylene oxide resins or blends of polyphenylene oxide with high impact polystyrene as sold under the trademark NORYL® by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL® by E.I. DuPont de Nemours & Co. of Wilmington, Del., and LOMOD® by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

Any of the cover layers can include polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional co-monomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. Preferably, the acrylic or methacrylic acid is present in about 8 to 35 weight percent, more preferably 8 to 25 weight percent, and most preferably 8 to 20 weight percent.

Any of the inner or outer cover layers may also be formed from polymers containing $\alpha,\beta$-unsaturated carboxylic acid groups, or the salts thereof, that have been 100 percent neutralized by organic fatty acids. The acid moieties of the highly-neutralized polymers ("HNP"), typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like.

The acid copolymers can be described as E/X/Y copolymers where E is ethylene, X is an $\alpha,\beta$-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, bebenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

A variety of conventional components can be added to the cover compositions of the present invention. These include, but are not limited to, white pigment such as $TiO_2$, ZnO, optical brighteners, surfactants, processing aids, foaming agents, density-controlling fillers, UV stabilizers and light stabilizers. Saturated polyurethanes are resistant to discoloration. However, they are not immune to deterioration in their mechanical properties upon weathering. Addition of UV absorbers and light stabilizers to any of the above compositions and, in particular, the polyurethane compositions, help to maintain the tensile strength, elongation, and color stability. Suitable UV absorbers and light stabilizers include TINUVIN®328, TINUVIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

Any method known to one of ordinary skill in the art may be used to polyurethanes of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition. Other methods suitable for forming the layers of the present invention include reaction injection molding ("RIM"), liquid injection molding ("LIM"), and pre-reacting the components to form an injection moldable thermoplastic polyurethane and then injection molding, all of which are known to one of ordinary skill in the art.

It has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated by reference in its entirety in the present application.

The outer cover is preferably formed around the inner cover by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using centering pins moving into holes in each mold. At a later time, a bottom mold half or a series of bottom mold halves have similar mixture amounts introduced into the cavity. After the reacting materials have resided in top mold halves for about 40 to about 80 seconds, a core is lowered at a controlled speed into the gelling reacting mixture.

A ball cup holds the ball core through reduced pressure (or partial vacuum). Upon location of the coated core in the halves of the mold after gelling for about 40 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. No. 5,006,297 and U.S. Pat. No. 5,334,673 both also disclose suitable molding techniques which may be utilized to apply the castable reactive liquids employed in the present invention. Further, U.S. Pat. Nos. 6,180,040 and 6,180,722 disclose methods of preparing dual core golf balls. The disclosures of these patents are hereby incorporated by reference in their entirety. However, the method of the invention is not limited to the use of these techniques.

The resultant golf balls typically have a coefficient of restitution of greater than about 0.7, preferably greater than about 0.75, and more preferably greater than about 0.78. The golf balls also typically have an Atti compression of at least about 30, preferably from about 50 to 120, and more preferably from about 60 to 100. A golf ball core layer, i.e., either the innermost core or any enclosing core layer, typically has a hardness of at least about 20 Shore A, preferably between about 20 Shore A and 80 Shore D, more preferably between about 30 Shore A and 65 Shore D.

When golf balls are prepared according to the invention, they typically will have dimple coverage greater than about 60 percent, preferably greater than about 65 percent, and more preferably greater than about 75 percent. The flexural modulus of the cover on the golf balls, as measured by ASTM method D6272–98, Procedure B, is typically greater than about 100 psi, and is preferably from about 500 psi to 150,000 psi. As discussed herein, the outer cover layer is preferably formed from a relatively soft polyurethane material. In particular, the material of the outer cover layer should have a material hardness, as measured by ASTM-D2240, less than about 70 Shore D, more preferably between about 25 and about 50 Shore D, and most preferably between about 40 and about 48 Shore D. The inner cover layer preferably has a material hardness of less than about 70 Shore D, more preferably between about 20 and about 70 Shore D, and most preferably, between about 25 and about 65 Shore D.

The core of the present invention has an Atti compression of less than about 120, more preferably, between about 20 and about 100, and most preferably, between about 40 and about 80. In an alternative, low compression embodiment, the core has an Atti compression less than about 20.

The overall outer diameter ("OD") of the core is less than about 1.650 inches, preferably, no greater than 1.620 inches, more preferably between about 1.500 inches and about 1.610 inches, and most preferably between about 1.52 inches to about 1.60 inches. The OD of the inner cover layer is preferably between 1.580 inches and about 1.650 inches, more preferably between about 1.590 inches to about 1.630 inches, and most preferably between about 1.600 inches to about 1.630 inches.

The present multilayer golf ball can have an overall diameter of any size. Although the United States Golf Association ("USGA") specifications limit the minimum size of a competition golf ball to 1.680 inches. There is no specification as to the maximum diameter. Golf balls of any size, however, can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The hybrid materials of the present invention may also be used in golf equipment, in particular, inserts for golf clubs, such as putters, irons, and woods, and in golf shoes and components thereof.

As used herein, the term "about," used in connection with one or more numbers or numerical ranges, should be understood to refer to all such numbers, including all numbers in a range.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising a core and a cover layer, wherein at least one of the core or cover layer comprises a hybrid material, wherein the hybrid material comprises a fatty acid-modified fluoroaluminosilicate glass ionomer.

2. The golf ball of claim 1, wherein the fatty acid is selected from a group consisting of butyric acid, caproic acid, caprylic acid, capric acid, lauric acid, myristic acid, palmitic acid, margaric acid, stearic acid, arachidic acid, behenic acid, lignoceric acid, palmitoleic acid, petroselinic acid, oleic acid, elaidic acid, cis-vaccenic acid, trans-vaccenic acid, gadoleic acid, gondoic acid, erucic acid, nervonic acid, linoleic acid, γ-linolenic acid, α-linolenic acid, stearidonic acid, dihomo-γ-linolenic acid, arachidonic acid, timnodonic acid, clupandonic acid, dimers, trimers and mixtures thereof.

3. The golf ball of claim 1, wherein the fatty acid-modified fluoroaluminosilicate glass ionomer is made at least in part by neutralizing the fluoroaluminosilicate glass ionomer with an inorganic metal cation and post-blended with a fatty acid or a fatty acid salt.

4. The golf ball of claim 3, wherein the fluoroaluminosilicate glass ionomer is neutralized from about 80% to about 100%.

5. The golf ball of claim 3, wherein the inorganic metal cation comprises barium, lithium, sodium, zinc, bismuth, chromium, cobalt, copper, potassium, strontium, titanium, tungsten, magnesium, cesium, iron, nickel, silver, aluminum, tin, calcium, manganese and mixtures thereof.

6. The golf ball of claim 3, wherein the fatty acid salt comprises barium, lithium, sodium, zinc, bismuth, chromium, cobalt, copper, potassium, strontium, titanium, tungsten, magnesium, cesium, iron, nickel, silver, aluminum, tin, calcium, manganese and mixtures thereof.

7. The golf ball of claim 1, wherein the fatty acid-modified fluoroaluminosilicate glass ionomer is made at least in part by neutralizing the fluoroaluminosilicate glass ionomer with a fatty acid salt.

8. The golf ball of claim 7, wherein the fluoroaluminosilicate glass ionomer is neutralized from about 80% to about 100%.

9. The golf ball of claim 7, wherein the fatty acid salt comprises barium, lithium, sodium, zinc, bismuth, chromium, cobalt, copper, potassium, strontium, titanium, tungsten, magnesium, cesium, iron, nickel, silver, aluminum, tin, calcium, manganese and mixtures thereof.

10. The golf ball of claim 2, wherein the core comprises a center and an outer core layer.

11. The golf ball of claim 10, wherein at least one of the center or the core layer comprises the hybrid material.

12. The golf ball of claim 2, wherein the cover comprises an inner cover layer and an outer cover layer.

13. The golf ball of claim 12, wherein at least one of the inner or outer cover layers comprises the hybrid material.

14. The golf ball of claim 13, wherein at least one of the inner or outer cover layer has a thickness of less than about 0.05 inches.

15. The golf ball of claim 2, wherein the core has an outer diameter of at least about 1.55 inches.

16. The golf ball of claim 15, wherein the core has an outer diameter of between about 1.57 inches and about 1.62 inches.

17. The golf ball of claim 2, further comprising thick or thin films, fillers, fibers, flakes, particulates, windings, adhesives, coupling agents, compatibilizers, composites, short or long fibrous reinforcements, and inks formed of the hybrid material.

18. The golf ball of claim 1, wherein the hybrid materials are present in fillers.

19. The golf ball of claim 15, wherein the fillers comprise fibers, flakes, particulates, short or long fibrous reinforcement.

* * * * *